United States Patent
Frenza et al.

(10) Patent No.: US 6,653,746 B2
(45) Date of Patent: Nov. 25, 2003

(54) ELECTRONIC DEVICE FOR SELECTING AND CONTROLLING THE STEERING MODES OF VEHICLES, IN PARTICULAR INDUSTRIAL VEHICLES WITH FOUR STEERING WHEELS

(75) Inventors: Rocco De Frenza, Riva del Garda (IT); Luciano Vimercati, Molina di Ledro (IT)

(73) Assignee: Dana Italia S.p.A., Zona Industriale-Arco (IT)

(*) Notice: Subject to any disclaimer, the term of this patent is extended or adjusted under 35 U.S.C. 154(b) by 157 days.

(21) Appl. No.: 09/843,300

(22) Filed: Apr. 25, 2001

(65) Prior Publication Data

US 2001/0038246 A1 Nov. 8, 2001

(30) Foreign Application Priority Data

May 2, 2000 (IT) ........................... MI2000A0947

(51) Int. Cl.[7] .................................................. B60L 1/00
(52) U.S. Cl. ...................... 307/10.1; 307/9.1; 180/236; 180/253
(58) Field of Search .................................. 307/10.1, 9.1; 180/236, 253; 324/207.22; 137/118.01

(56) References Cited

U.S. PATENT DOCUMENTS

| | | | | |
|---|---|---|---|---|
| 5,238,077 A | * | 8/1993 | Vaughn et al. | 180/140 |
| 5,359,288 A | * | 10/1994 | Riggs et al. | 324/207.22 |
| 6,223,763 B1 | * | 5/2001 | Meyer et al. | 137/118.01 |

* cited by examiner

Primary Examiner—Gregory J. Toatley, Jr.
Assistant Examiner—Robert L. DeBeradinis
(74) Attorney, Agent, or Firm—Hedman & Costigan, P.C.

(57) ABSTRACT

An electronic device for selecting and controlling the steering modes of vehicles, in particular industrial vehicles, comprising an electronic control unit (30), which receives two input signals (S3, S4) from two magnetic sensors (34, 36), which are placed onto the pistons (20, 22) of the rear axle and the front axle, respectively, of the vehicle; the sensors (34, 36) are activated when suitable magnetic bands (32, 38) which are provided on the pistons (20, 22) of the steering cylinders (24, 26), pass in front of them and they enable, by means of the control unit (30), an automatism (28) that switches to a prefixed steering mode when the front and rear wheels of the vehicle are aligned.

8 Claims, 3 Drawing Sheets

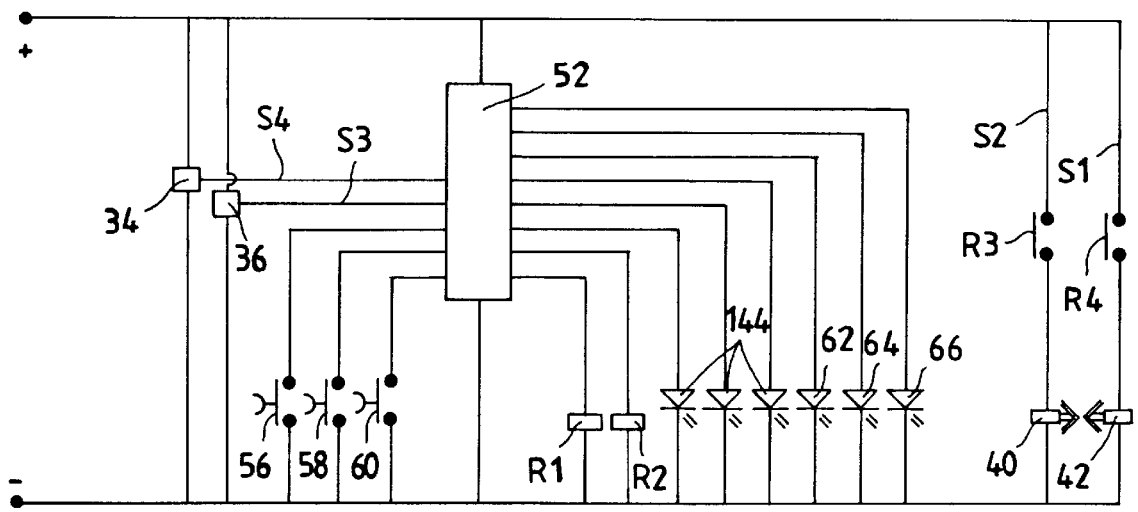

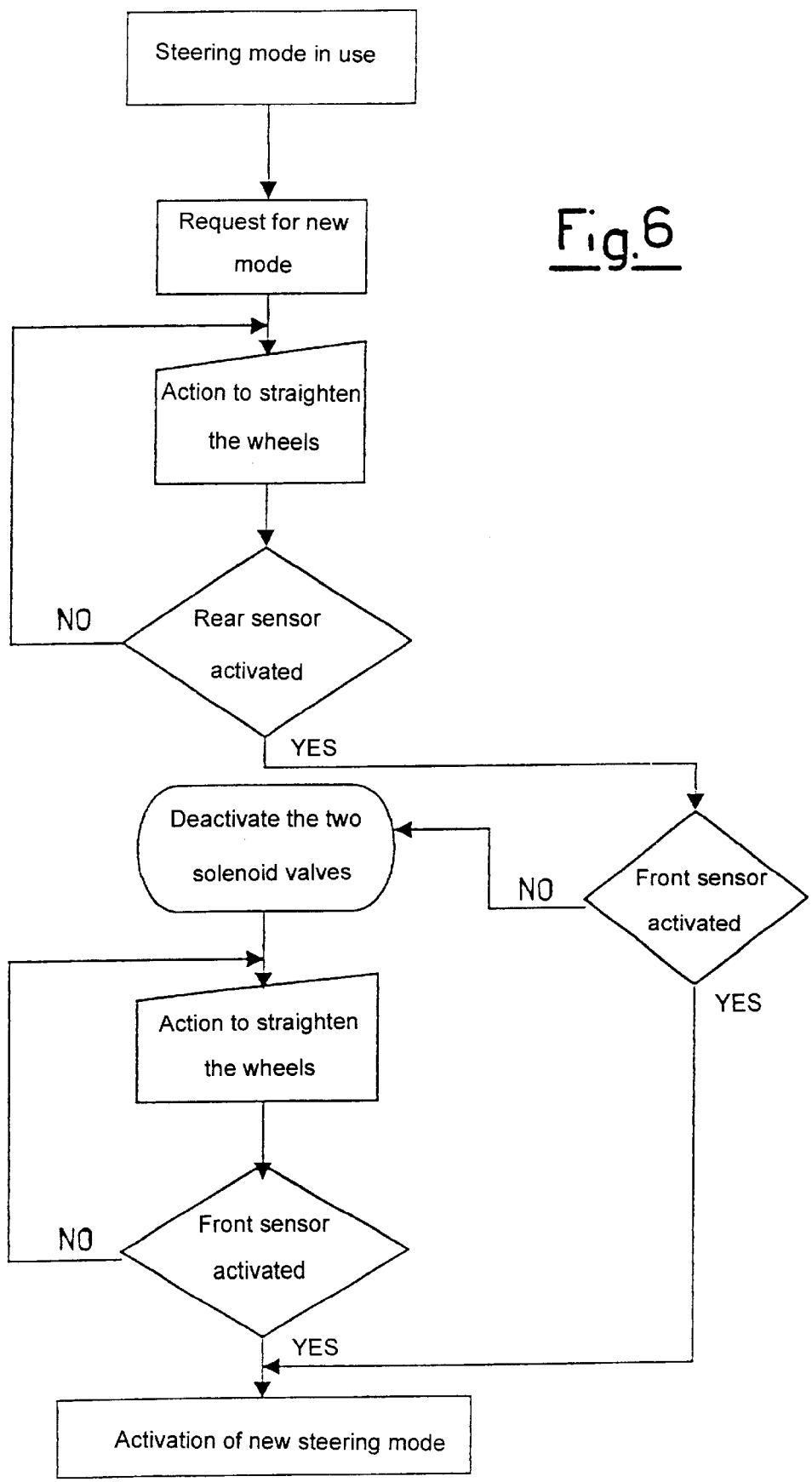

ELECTRONIC DEVICE FOR SELECTING AND CONTROLLING THE STEERING MODES OF VEHICLES, IN PARTICULAR INDUSTRIAL VEHICLES WITH FOUR STEERING WHEELS

FIELD OF THE INVENTION

The present invention relates to an electronic device for selecting and controlling the steering modes of vehicles, in particular industrial vehicles with four steering wheels.

BACKGROUND OF THE INVENTION

It is known that the four steering wheels of an industrial vehicle can be positioned in various ways, by the operator, in order to align them according to three main modes of vehicle steering: normal or road steering, the mode known as "at pilgrim step" or "coordinated" and the mode known as "crab".

The compulsory condition for correct operation of switching from one mode to the other lies in the fact that the axles of the wheels must always be synchronised, meaning that the two centres of gravity of each axle must remain aligned along a direction perpendicular to the axle.

Therefore, at present, in order to change the steering mode, the operator must turn the steering wheel until identifying first the centre of the steered axle of the rear wheels and then switch to normal to centre the front wheels so that the centres of the two steered axles, rear and front respectively, are aligned along a direction perpendicular to the axles; only after this alignment operation, it is possible to switch to a desired steering mode.

Therefore, operations to identify and align the centres of each steering axle are performed, in the known way, by means of pilot lights, each of them flashing when the condition of synchronisation of each axle is complied with.

Thus, in order to change the steering mode, at present, the operator firstly must turn the steering wheel until a first pilot light of the instrument panel is on to indicate that the axle of the rear wheels is synchronised and then said operator must switch the steering mode of the wheels to the desired mode, by means of a switch or selector, also positioned on the instrument panel.

After the steering cylinder of the rear wheels has been locked, the operator must then turn the steering wheel again until reaching a position in which a second pilot light of the instrument panel, which identifies the position of synchronisation of the axle of the front wheels, is on; then it is possible to switch to another steering mode by using the selector.

It is evident that this procedure to vary the steering mode, although relatively simple to be performed by the operator of an industrial vehicle, however, requires extremely lengthy execution times, especially in the event that variations of the steering mode are particularly frequent (due, for example, to frequent variations in the structure of the ground or to the variety of routes to be taken by the vehicle).

Moreover, if there is an oil leak in the hydraulic distribution circuit or a blow-by from one chamber to the other of a steering cylinder, this causes loss of synchronism and alignment between the steering axles, which can no longer be retrieved except by performing a new alignment operation.

Lastly, the correct operation of these systems, in order to vary the steering mode, is closely dependent on the type of control and the manoeuvring ability of the operator, with consequent risks of erroneous steering geometries.

SUMMARY OF THE INVENTION

The object of the present invention is, therefore, to remedy the above inconveniences and, in particular, to indicate an electronic device for selecting and controlling the steering modes of vehicles, in particular industrial vehicles with four steering wheels, which permits all possible switchings from one steering mode to the other of the front and/or rear wheels of a vehicle to be performed automatically and in relatively short times, compared to the prior art.

Another object of the present invention is to indicate an electronic device for selecting and controlling the steering modes of industrial vehicles with four steering wheels, which permits easy and rapid retrieval of the synchronism between the front and rear axles, once said synchronism has been lost due to errors by the operator, malfunctions or leaks in the hydraulic distribution circuit.

A further object of the invention is to produce an electronic device for selecting and controlling the steering modes of industrial vehicles with four steering wheels, simple to use, even by operators who are not particularly skilled in traditional manoeuvres to synchronise the steering axles.

These and other objects are obtained by an electronic device for selecting and controlling the steering modes of vehicles, in particular industrial vehicles with four steering wheels, according to claim 1.

Other characteristics of the device can be deduced in the subsequent claims.

Advantageously, the electronic device according to the invention allows the operator to switch, automatically and by means of simple selection operations, to a desired steering mode, from any initial steering mode.

Moreover, switching to the steering mode requested takes place when the pairs of wheels mounted on the front and rear steering axles are perfectly synchronised.

BRIEF DESCRIPTION OF THE DRAWINGS

The characteristics of the invention shall become more obvious in the following description and in the annexed drawings, which refer to a preferred embodiment of the invention. In the alleged figures:

FIG. 2 shows an electronic circuit of the selection and control device according to the present invention;

FIGS. 3–5 show three graphs relative to a series of logic signals which are sent to the electronic control device, according to the present invention;

FIG. 6 shows a block diagram relative to the functioning of the electronic device, according to the present invention.

DETAILED DESCRIPTION OF THE INVENTION

Figure 1:
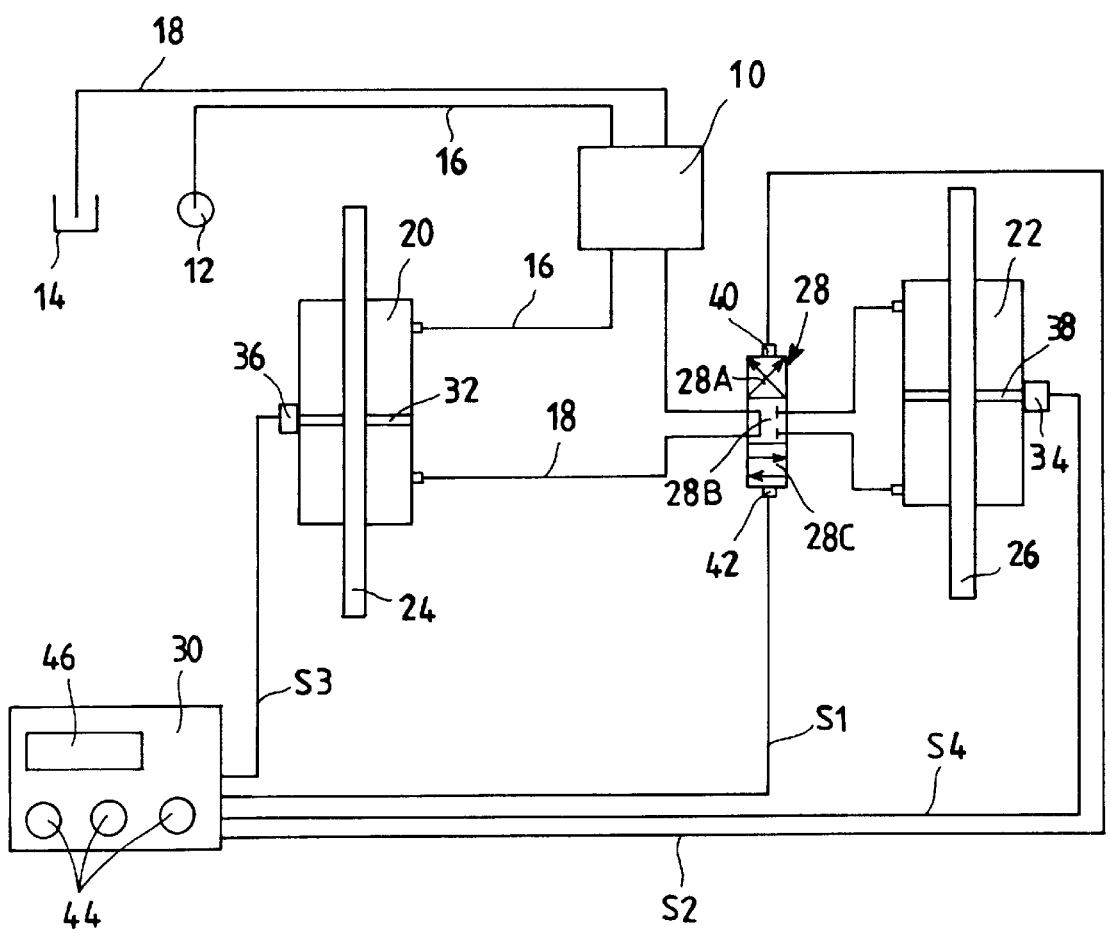
FIG. 1 shows a hydraulic and electric circuit of a distribution circuit, able to communicate the steerings modes of industrial vehicles and which is controlled by an electronic device for selection and control, according to the present invention.

With particular reference to FIG. 1, 10 schematically indicates a power steering box ("orbitrol") of an axle with two steering wheels of an industrial vehicle.

Upstream the power steering 10, a hydraulic pump 12 and a discharge tank 13, connected to the hydraulic distribution lines 16, 18 respectively, are provided, while 20, 22 indicate two pistons and 24, 26 indicate the steering cylinders of one of the pairs of wheels of the vehicle (front or rear).

The reference number 28 indicates a slide valve 28A, 28B, 28C distributor that allows for a switching of the programmed steering modes, thanks to the electric signals S1, S2, which are transmitted by the electronic control unit 30, and which control the solenoid valves 42, 40; two further signals S3 and S4 respectively, are transmitted to the control unit 30 by two magnetic alignment sensors 34, 36 (for example, of the Hall effect type), positioned at the centre of each steering cylinder 24, 26, when a magnetic band, 32, 38, which is respectively provided onto each piston 20, 22, is in front of a respective sensor 34, 36.

In order to automatically synchronise the four steering wheels of the industrial vehicle in the three steering modes: (normal, that is to say with only front steering wheels, at "pilgrim step", that is to say with front and rear wheels which steer in two oblique lines or at "crab step", that is to say with the front and the rear wheels, which steer, two by two, in two parallel directions), it is first necessary to align the rear wheels in relation to a central point of the respective steering axle, then lock the steering cylinders of the rear wheels and lastly align the front wheels, so that the central point of the steering axle of the front wheels is positioned by an imaginary axis, which is perpendicular to the axle of the rear wheels and passing through its central point.

In a preferred embodiment of the present invention, the front of the electronic control unit 30 is provided with three push-buttons 44 relative to the steering modes, while a first series of pilot lights indicate the selection in use and a second series of pilot lights indicate the activation of the magnetic sensors 34, 36 of the front and rear axles when the respective magnetic band 32, 38 is in front of a respective sensor 34, 36.

Finally, it is possible to provide another pilot light to indicate a condition of manual alignment and a screen, indicated with 46, able to visualize the instructions given by the user and the functions performed by the electronic device.

The operation of the electronic device according to this invention is essentially as follows.

As clearly illustrated in the block diagram of FIG. 6, regardless of the steering mode set on the vehicle at a certain moment, in order to switch to the desired steering mode, the operator selects a push-button relevant to the steering mode requested and turns the steering wheel of the vehicle, in order to synchronise the wheels by aligning the central points of the two steering axles.

Then, when the points are aligned, an automatic switching to the steering mode requested is performed and the operator releases the push-button.

If the sensor relative to the front wheels is not activated, a subsequent action to straighten the wheels permits its activation.

Normally, the activation of the rear sensor causes the rear cylinder to lock in the centre, while the activation of the front sensor causes a switching to the new steering mode; however, if the front sensor is not activated, switching is not enabled and therefore the operator can once again straighten the front wheels, so that switching is obtained when the steering direction of the wheels passes through the centre.

In this way, the simple loss of synchronism of the wheels, which can occur for various reasons (leaks in the hydraulic circuit, tampering, circuit malfunctions), is retrieved by performing a further action to straighten the wheels until the central points of the axles are again aligned.

Moreover, when the alignment operation is performed, the pilot light 144 of the steering mode requested flashes, while the pilot light 144 relevant to the previous selection is constantly on; only after synchronisation has occurred, the pilot light 144 of the selected steering mode is constantly on, while the pilot light 144 relevant to the previous steering mode is off.

As the synchronisation and switching operation requires a certain amount of time, during which the push-button of the requested mode must be pressed and held, if the push-button is released before the electronic device has terminated the operation, the three pilot lights 144 that indicate the steering mode flash simultaneously, indicating an incorrect operation and, therefore, the alignment operation must be repeated.

The last selected function is always memorized, even when the control unit 30 is switched off.

With particular reference to FIG. 2, which shows a diagram of the electronic circuit used in the device according to this invention, 52 indicates a programmable read only memory, of the EEPROM type, to which the signals S3, S4, received from the sensors 36, 34 respectively, and the signals received from the selectors 56, 58, 60 of the distributor 28, are fed.

The programmable memory 52 controls the switching relays R1, R2 respectively, the operation pilot lights 144 in the different steering modes, the pilot light 62 for manual alignment of the axles, the pilot lights 64, 66 to enable alignment of the front wheels and the rear wheels and the solenoid valves 40, 42, by means of the switches R3, R4, along which the signals S2, S1 run respectively.

With reference to the FIGS. 3–5, the logic signals S1, S2, S3, S4 and a signal CA, which enables a selection automatism of the suitable steering mode, are sketched.

As shown in FIG. 3, during switching from a "crab" type mode to a "pilgrim step" type mode, when the logic signal S3 of the magnetic sensor 36 is high (level 1), the signals S1, S2 are low (level 0) and the switching of the logic signal S4, from low to high, which is received from the magnetic sensor 34, enables the automatism.

FIG. 4 shows the signals of FIG. 3, in case the switching of the steering modes occurs between a "pilgrim step" type mode and a "crab" type mode.

Moreover, FIG. 5 shows the signals S1, S2, S3, S4, CA during switching from the normal or road mode to "pilgrim step" type mode. In this case, the switching from 0 to 1 of the logic signal relative to the sensors 34, 36 enables the automatism to vary the steering mode and the logic signal S2 enables the solenoid valve 40.

Finally, by using the electronic device according to the present invention, it is also possible to switch from automatic operation, as described above, to manual operation, according to the traditional operation of a device to vary the steering mode of the known type.

In order to switch from an automatic control to a manual control of an operation of axles alignment, the push-buttons 44 relative to the normal or road mode and to the "pilgrim step" mode must be simultaneously pressed and held pressed for about 0.5 seconds; this pressure will cause the manual alignment pilot light 62 to flash.

Now, to switch from one steering mode to another, the push-button 44 of the steering mode required must be pressed and held pressed for about 1 second, and subsequently aligning the rear wheels until the pilot light 66 is on.

A subsequent switching to an automatic operation is performed once again by pressing simultaneously the push-buttons 44 relative to the "normal" or road steering mode and to the "pilgrim step" steering mode for about 0.5 seconds; in this case the pilot light 66 is off and, subsequently, it will be possible to select the steering mode desired by means of an automatic procedure such as the one described above.

From the description given the characteristics of the electronic device for selection and control of the steering modes of vehicles, particularly industrial vehicles with four steering wheels, according to the present invention, are evident, as are the advantages.

In particular, these relate to the following aspects:

more reliable, more rapid switching and more simple to use, compared with prior art;

precise and correct operation;

possibility of switching from an automatic type operation to a traditional manual type operation;

low costs, compared with prior art.

It is evident that numerous other variants may be effected to the electronic device for selecting and controlling the steering modes of vehicles, according to the present invention, without thus departing from the principles of intrinsic novelty of the inventive idea. It is also evident that, in the practical application of the invention, the materials, forms and dimensions of the details illustrated may vary according to requirements and these may be replaced with others that are technically equivalent.

What is claimed is:

1. Electronic device for selecting and controlling the steering modes of industrial vehicles with four steering wheels to align the front and rear wheels of said vehicle, by locking in position a steering cylinder (24, 26) having a piston (20, 22, said steering cylinder being attached to at least one pair of wheels, said device comprising an electronic control unit (30), said control unit (30) having push buttons (44) for switching said steering modes from automatic alignment to a manual alignment and being adapted to receive signals (S3, S4) from at least one alignment sensor (36, 34), positioned in line with said piston (20, 22) of at least one of said steering cylinders (24, 26), which is provided with a magnetic band (32, 38), said control unit (30) controlling with electric signals a plurality of distributor means (28, 28A, 28B, 28C, 40, 42), that switch from one of said steering modes to another when said alignment occurs.

2. Electronic device as claimed in claim 1, wherein said distributor means (28, 28A, 28B, 28C,) comprise at least one sliding valve (28A, 28B, 28C) distributor (28) and at least one solenoid valve (40, 42), which control switching between the various steering modes.

3. Electronic device as claimed in claim 1, wherein said distributor means (28, 28A, 28B, 28C, 40, 42) are connected to two pairs of steering cylinders (24, 26) of the wheels of the vehicle, by means of a hydraulic circuit, that permits switching among a road steering mode, a "normal" steering mode, a "pilgrim step" steering mode and a "crab step" steering mode.

4. Electronic device as claimed in claim 1, wherein said electronic control unit (30) comprises a series of push-buttons (44) that control said steering modes, a visualization screen (46) to control functions and a series of pilot lights (62, 64, 66), which indicate: (a) a steering mode in use, (b) activation of said sensors (34, 36) upon passing of said magnetic bands (32, 38) and (c) conditions of automatic and manual alignment of the wheels of said vehicle.

5. Electronic control device as claimed in claim 4, wherein switching from one to another steering mode is performed by operating at least one of said push-buttons (44) to select a new steering mode, followed by an action to straighten the wheels of said vehicle, which, in one or more attempts, permits activation of said rear and front sensors (34, 36) of the vehicle to activate new steering mode.

6. Electronic device as claimed in claim 1, wherein said electronic control unit (30) comprises an EEPROM electronic programmable memory board (52), the inputs of which receive the signals (S3, S4) from said sensors (36, 34) and which emit the control signals to switch from one mode of steering to another.

7. Electronic device as claimed in claim 6, wherein said programmable memory board (52) memorizes the last steering mode selected, so that if said vehicle is switched off, when said vehicle is switched on again said device always directs the last alignment operation to be performed.

8. Electronic device as claimed in claim 1, wherein a plurality of pilot lights (144) of the control unit (30) indicate operating faults.

* * * * *